United States Patent [19]

Shimirak et al.

[11] Patent Number: 4,908,482
[45] Date of Patent: Mar. 13, 1990

[54] CABLE CLOSURE

[75] Inventors: Gerald L. Shimirak, Danville; Paul S. Chan, San Francisco; Darcey Messner, Mountain View, all of Calif.

[73] Assignee: Raychem Corporation, Menlo Park, Calif.

[21] Appl. No.: 130,348

[22] Filed: Dec. 8, 1987

[51] Int. Cl.[4] .............................................. H02G 15/10
[52] U.S. Cl. ...................................... 174/93; 174/60;
174/65 G; 174/92
[58] Field of Search .................. 174/93, 41, 44, 59,
174/60, 92, 65 G, 153 G

[56] References Cited

U.S. PATENT DOCUMENTS

| | | | |
|---|---|---|---|
| 1,034,909 | 8/1912 | Graybill | 174/68 C X |
| 2,067,644 | 1/1937 | Olley et al. | 174/77 R |
| 2,410,802 | 11/1946 | Bain | 174/68 R |
| 2,922,836 | 1/1960 | Brown | 174/153 G |
| 3,158,680 | 11/1964 | Lovitt et al. | 174/41 |
| 3,163,882 | 1/1965 | Falkenberg | 174/153 G |
| 3,337,681 | 8/1967 | Smith | 174/92 |
| 3,499,097 | 3/1970 | Widstrand | 174/65 G |
| 3,510,628 | 5/1970 | Zahaykevich | 174/65 G |
| 3,523,156 | 8/1970 | Phillips, Jr. | 174/65 G |
| 3,701,835 | 10/1972 | Eisele et al. | 174/41 |
| 3,846,575 | 11/1974 | Troy | 174/72 A X |
| 3,916,086 | 10/1975 | Gillemot et al. | 174/93 |
| 4,390,744 | 6/1983 | Suffi et al. | 174/41 |
| 4,519,014 | 5/1985 | Skovran et al. | 174/93 X |
| 4,536,611 | 8/1985 | Butler | 174/59 X |
| 4,694,118 | 9/1987 | Schmidt | 174/41 |
| 4,701,574 | 10/1987 | Shimirak et al. | 174/93 |
| 4,734,061 | 3/1988 | Randall, Jr. et al. | 439/709 |

FOREIGN PATENT DOCUMENTS

| | | |
|---|---|---|
| 462409 | 1/1950 | Canada ................................. 174/44 |
| 0191609 | 8/1986 | European Pat. Off. . |
| 1204729 | 7/1963 | Fed. Rep. of Germany . |

*Primary Examiner*—Morris H. Nimmo
*Attorney, Agent, or Firm*—A. Stephen Zavell; Herbert G. Burkard

[57] ABSTRACT

A telecommunications cable closure for connecting conductors of a multi-core cable via a terminal block to drop wires. The closure has a rotatable window to allow ready access. Drop wires may leave through grommets having slots therein to avoid the need to thread them through holes.

24 Claims, 10 Drawing Sheets

FIG_1a

FIG_1b

FIG_1c

FIG_1d

FIG_4

FIG_5

FIG_6a

FIG_6b

FIG_7a

FIG_7b

FIG_7c

FIG_8

FIG_9

CABLE CLOSURE

BACKGROUND OF THE INVENTION

The present invention relates to a cable closure, particularly to an aerial cable splice case, more particularly to a ready access splice case, especially for the telecommunications industry.

Closures are required around cables, to provide environmental protection, particularly against water and other contaminants and against insect or animal damage. Such closures are especially necessary around cable splices where one cable is terminated, where one cable is joined to one or more other cables, or where drop wires (for example to individual subscribers in the case of a telecommunications cable) are joined to a cable. The level of environmental protection required will depend on the type of cable and its location. In general, buried cables require a more complete seal than aerial cables because buried cables may become immersed in water. Also, pressurised cables require a pressure resistant seal, whereas unpressurised cables may not. Some aerial closures may offer protection merely against excessive sunlight, rain or insects and animals, but be able to pass air and may have provision for water drainage should any water accumulate inside. In each of these cases, however, a closure may be said to be provided that offers some sort of environmental seal.

Many designs of cable closure have been proposed, and the following are given as examples.

U.S. Pat. No. 3,337,681 (Smith) discloses a cylindrical cable splice case comprising two rigid half-shells that are bolted together through longitudinally extending flanges thereof. An end seal is provided at each end of the resulting cylinder. The end seals have holes through which the outgoing cables pass.

U.S. Pat. No. 3,711,632 (Ghirardi) discloses an end fitting for use with a flexible axially slit tube for housing a plurality of electrical leads. The end fitting includes a pair of sections of generally circular cross-sectional shape which are hinged along their adjacent side edges and which are foldable about the hinges to a closed position.

U.S. Pat. No. 4,421,945 (Moisson) discloses a re-enterable assembly for forming a cable splice case, which comprises a split tube, each half of which rests on support end pieces through which ingoing and outgoing cables pass. The halves of the split tube have projections for mutual interengagement. The end pieces and split tube are surrounded by a heat-shrinkable sleeve.

U.S. Pat. No. 3,836,694 (Kapell) discloses a re-enterable cable splice case comprising a two-part housing. A removable layer of water restricting material is provided around the splice within the housing U.S. Pat. No. 3,846,575 (Troy) discloses a ready access cable closure which comprises a base that includes upstanding ends through which the cables pass. A cover is provided that, together with the base, forms a sealed housing. The cover, U-shaped in cross-section, is installed by positioning it over the base in a direction perpendicular to the length of the splice. Drop wires can leave the splice through holes in the base.

U.S. Pat. No. 4,519,014 (Skorran) discloses a ready access splice closure, having end pieces that are slotted over the cables either side of the splice. A tube is positioned over the splice and over the end pieces.

U.S. Pat. No. 4,581,265 (Follette) discloses a flexible wraparound closure for enclosing a cable splice, and which can be easily reopened. The closure comprises a flexible water-resistant sheet, opposite edges of which can be brought together around the splice and held together for example by a zipper. The sheet, together with any internal liner, can be held in the open position by means of a holding collar that can be rotated into a position above the splice. This allows work to be carried out on the splice. End seals between the wrapped sheet and the cables may comprise a gel material.

U.S. Pat. No. 3,701,835 (Eisele et al.) disclose a cable terminal unit providing a limited access cable compartment within which electrical leads from terminal blocks may be spliced into a telephone cable. The unit is generally cylindrical, a part of the cylindrical surface being hinged with respect to the remainder so that the compartment can be exposed.

SUMMARY OF THE INVENTION

We have now designed a cable closure that is particularly, although not exclusively, useful for telecommunications cables (including optical fiber cables), especially for aerial cables, and most especially where many drop wires are to be connected to a multi-core cable and where relatively frequent inspection of, or alteration of, the connections is envisaged.

Thus, the invention provides a ready-access cable closure for enclosing a connection to a cable, comprising:

(a) a closure body that can surround said connection; and (b) a seal that can seal between a conductor leaving the body and the conductor;

the closure body having a first part that may be fixed relative to the cable and a second part that can be slid from a first position where the closure environmentally seals said connection to a second position where it is supported by the first part and where it allows access to said connection.

Reference to the first part being fixed relative to the cable is to be understood simply in terms of the closure body continuing to surround the connection such that the closure can provide the desired environmental seal. Some relative movement may be allowed, for example both the first and second parts could be rotatable around the cable.

The closure body may be fixed relative to the cable by means which comprise said seal (b). The closure body is preferably substantially cylindrical and end pieces are preferably provided at each end, and may be integral with the body proper. One or both of the end pieces may have a hole therethrough, through which a cable leaves the closure. The seal (b) may for example comprise such an end piece or an insert that seals between an end piece and the cable, or another part of the body having a suitably sized hole therein.

The first part of the closure body preferably surrounds the connection to a greater extent than does the second, moveable, part. In a preferred embodiment the second part comprises an openable window in the first part. For example, the first part may comprise a substantially cylindrical housing having an opening therein that extends less than 100% of the length of the cylinder (preferably 30–95%, especially 60–90%) and less than 180° of arc (preferably 30°–75°, especially 45°–50°). The opening may be closed by the second part when slid to its first position. The first part preferably supports the second part in both the first position and the second position. This is of particular advantage in aerial applications since there is no danger of the second part being dropped. The sliding movement is preferably circumferential with respect to the first part, although it may be axial. Friction or gravity etc. may hold the second part open, or some latch or other locking means may be provided.

We prefer that the overall size of the closure body is substantially the same with the second part in its first position as with it in its second position. This provides an advantage over prior art designs where room is taken up when access is required.

The closure may include means for suspending it from a cable, a cable splice case or catenary wire. Such means may be fixed to the first part and preferably comprise an arm plus u-bolt.

A terminal block may be provided within the closure body, terminals of which are connected to an outgoing cable. Generally such a terminal block will then allow drop wires to subscribers to be electrically connected to binding posts thereof, and consequentially to conductors of said cable. The terminal block may include insulation displacement means, such that an insulated wire may be inserted therein without pre-stripping, and electrical connection be made simply by tightening down a cap or other means. The contacts of such a terminal block may be sealed with a sealing material such as a gel. Suitable blocks are described in U.S. Ser. No. 70,475 filed July 7, 1987 and U.S. Ser. No. 102,072 filed Sept. 29, 1987, the disclosures of each of which are incorporated herein by reference.

The closure of the invention can therefore serve to connect a multi-core cable to a plurality of drop-wires. The multi-core cable may come from another remote location and it may terminate at the closure (for example by all of its conductors being connected there to drop wires) or it (or another cable to which it is spliced) may continue through the closure, some only of its conductors being connected there to drop wires. Alternatively, the multi-core cable may be of short length and serve only to connect a nearby cable to the terminal block, and hence to the drop wires. A second closure (which may but need not be a closure of the invention) may surround a splice between that short length of multi-core cable and the nearby cable. The second closure and the closure of the invention may be mechanically connected. For example the two closures may each by cylindrical and attached side-by-side, or end-to-end.

A further possibility is to provide a single enclosure having two parts thereto. One part may house a cable splice, and the other part may house a terminal block. Preferably movement of the first part of the closure body exposes only the terminal block since the terminal block is likely to require more frequent attention than the cable splice. One way of achieving this is to provide a compartment within the closure body that houses the cable splice, said compartment preferably being at least temporarily sealed.

Thus, the invention also provides a cable closure assembly, which comprises:

(a) a first housing for housing a cable splice;

(b) a second housing for housing a terminal block; and (c) means for exposing the terminal block without opening said first housing.

The second housing and the first housing may be housed within a further, larger, housing, or they may be merely mechanically attached together. Preferably the first housing lies within the second housing. The first and/or second housing may comprise closure bodies as described herein.

The drop wires that are connected to the terminal block (or other means in the closure body) may enter one closure through holes therein, which holes may be sealed by a grommet or sealing material. The holes are preferably spaced along the length of the closure body. We have found that difficulty can be experienced in positioning a drop wire the correct distance through a hole having a closed periphery and then making the desired connection to, for example, the terminal block. We have further found that a hole in the form of a slot extending from an edge (for example an edge revealed when the second part is slid to its open position) overcomes this problem: then, the drop wire may be connected to a terminal block and subsequently placed in the slot. The slot opening may be closed by the second part when slid to its closed ("first") position. Where the drop wire is substantially rectangular or oval in cross-section, the slot, or a grommet that fits in a slot in the body may have a portion nearer its opening of narrower width and a portion farther from the opening of greater width so that such a wire can be laterally inserted and after rotation cannot be laterally removed. Such a slot (or grommet) may be provided on a closure in the absence of the slidable second part.

The seal (b) of the closure body may comprise a material that has an ultimate elongation (as determined by ASTM D638-80 at 70° F., 21° C., using a Type 4 die and at a speed of 50 cm per minute) of greater than 50%, preferably greater than 100%, more preferably greater than 200%. The material preferably has a cone penetration value (as determined by ASTM D217-68 on an undisturbed sample at 70° F., 21° C. using a standard 1:1 scale cone, cone weight 102.5 g, shaft weight 47.5 g) of between 65 and 350, preferably 65–200 ($10^{-1}$ mm). The closure may be cylindrical having end pieces that fill an annular space between the or each outgoing cable and the closure body. Such end pieces may comprise a material, preferably a pre-cured material, which may be referred to as a gel, having the above ultimate elongation and having a cone penetration towards the harder end of the range given above. The closure may therefore have features of the design disclosed in U.S. Pat. No. 4,701,574 (Shimirak et al.) the disclosure of which is incorporated herein by reference.

DETAILED DESCRIPTION OF THE INVENTION

Figure 1A:
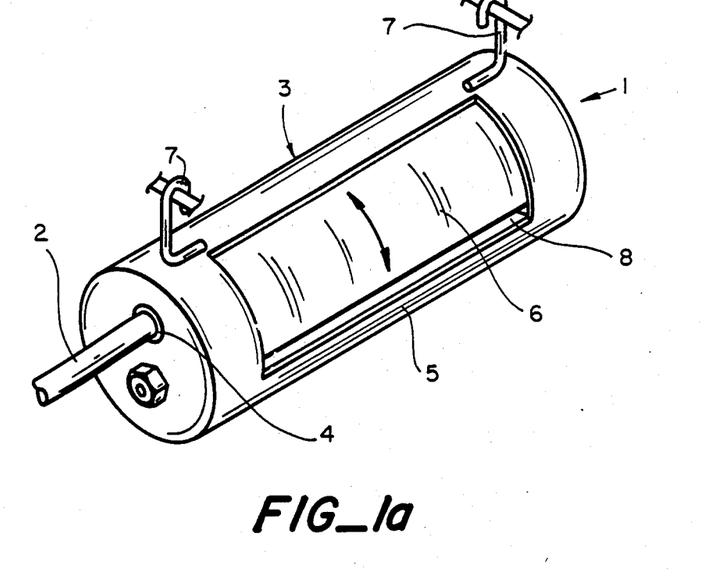
FIGS. 1a–1d are perspective views of closures of the invention.

FIG. 1a shows a cable closure 1 from which a cable leaves. The closure comprises a closure body 3 and a seal 4 (which may be an entire end piece or a separate sealing member or merely a part of the body having correctly sized aperture therein). the closure preferably is non-transparent and preferably comprises a UV-resistant plastics material.

The closure body comprises a fixed first part 5 and a slidable second part 6. The body has means such as hooks 7 to suspend it from a cable or from a catenary wire etc. In FIG. 1a the second part 6 is shown rotated almost to its closed position, leaving a small opening 8.

Figure 1B:
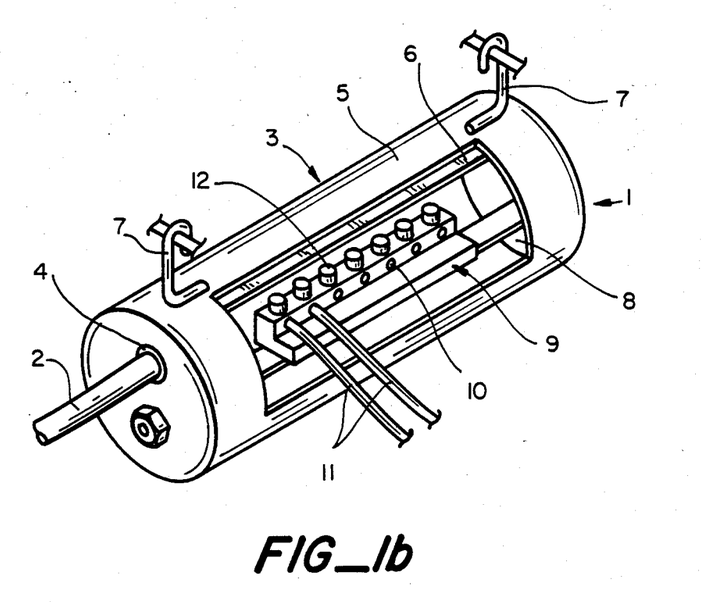

FIG. 1b shows the second part 6 rotated almost to its fully open position, exposing for access a terminal block 9. The terminal block 9 has holes 10 for insertion of drop wires 11. Caps or other means 12 can be used to make electrical connection to the drop wires 11, and may include insulation displacement means. Thus, the terminal block 9 can provide electrical connection between the cable 2 and drop wires 11 that may go to individual telephone or other subscribers. The closure therefore allows ready access for testing or for alteration to the way in which subscribers are connected to the cable 2. This design of closure could be used for connection to other types of cable, for example to optical fiber ables by choice of a suitable organizer etc. instead of the electrical terminal block shown.

Figure 1C:
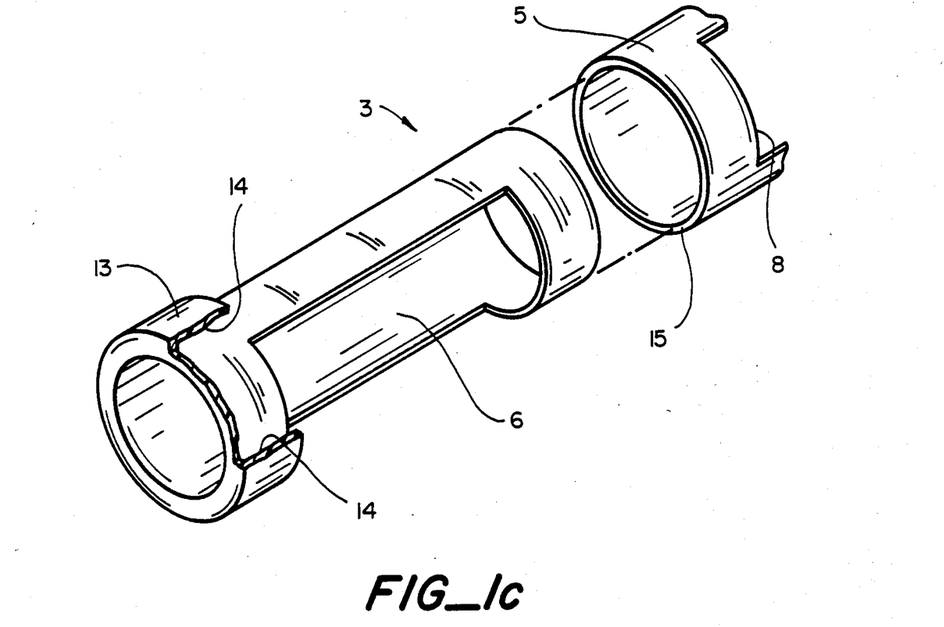

The part 6 may be fixed in any suitable way so long as it is able to undergo rotation or other sliding motion. It may have radius arms at its ends or have end plates etc. which are rotatably mounted with respect to end plates of the first part 5. One possibility is illustrated in FIG. 1c where the part 6 has a collar at one end (not visible in FIG. 1c) that lies within the part 5, and a collar 13 at the other end separated from its intermediate portion by an annular space 14 into which an end portion 15 of part 5 can slide. When the two parts 5 and 6 are assembled, the collar 13 can be rotated by hand with respect to the part 15 to open and close the closure.

Figure 1D:
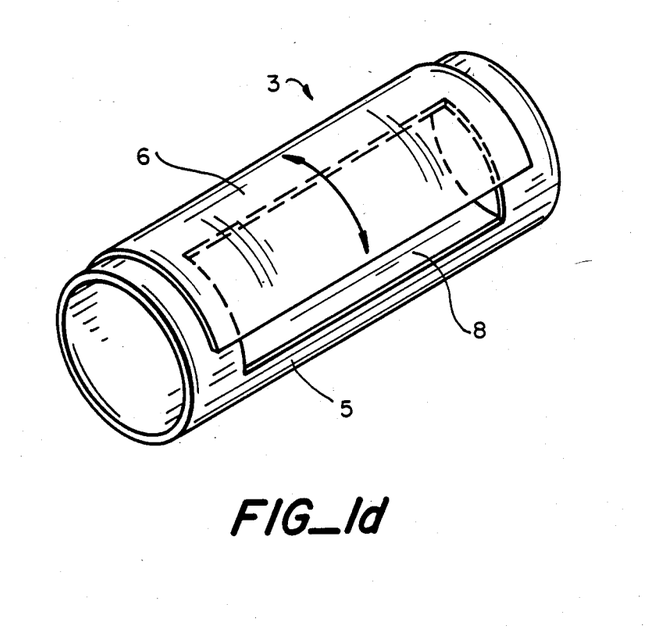
Figure 2:
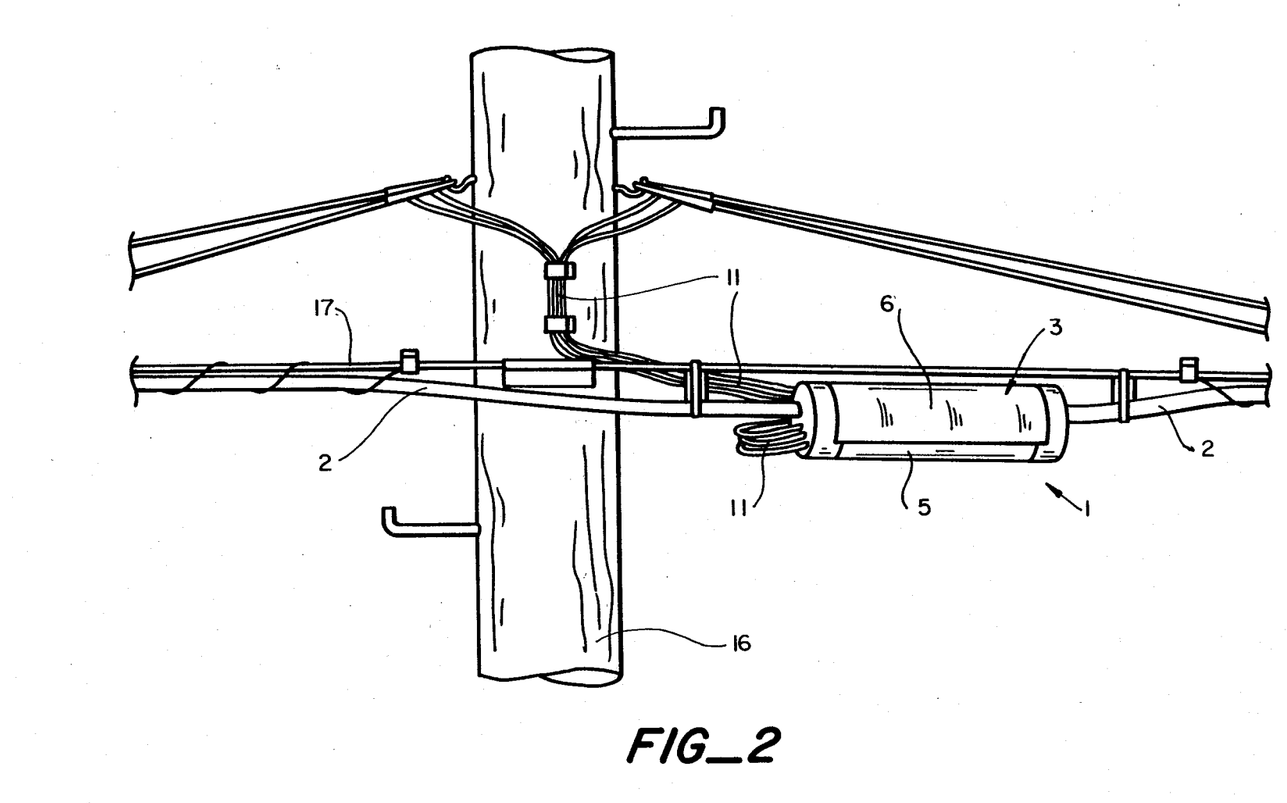
FIGS. 2–5 show closures and closure assemblies of the invention installed on telecommunications cables.

An alternative design is shown in FIG. 1d, where the moveable part 6 is positioned outside the fixed part 5.

FIGS. 2-5 show a closure and an assembly of the invention as installed. A pole 16 carries a catenary wire 17 from which is suspended a telecommunications cable 2. The cable 2 enters and leaves the closure 1, or alternatively (and as in FIG. 2) two cables 2 are spliced within closure 1. In either case some of the conductors in one of the cables are terminated within the closure 1 for example at a terminal block. The terminal block (not shown because the part 6 is in the closed position) then provides electrical connection to drop wires 11 that, in the embodiment shown, leave the closure 1 through an end piece. The closure 1 of FIG. 2 has two compartments therein, and that houses a splice between cables 2, and one that houses the terminal block and is openable by moving, preferably by sliding, the part 6.

Figure 3:
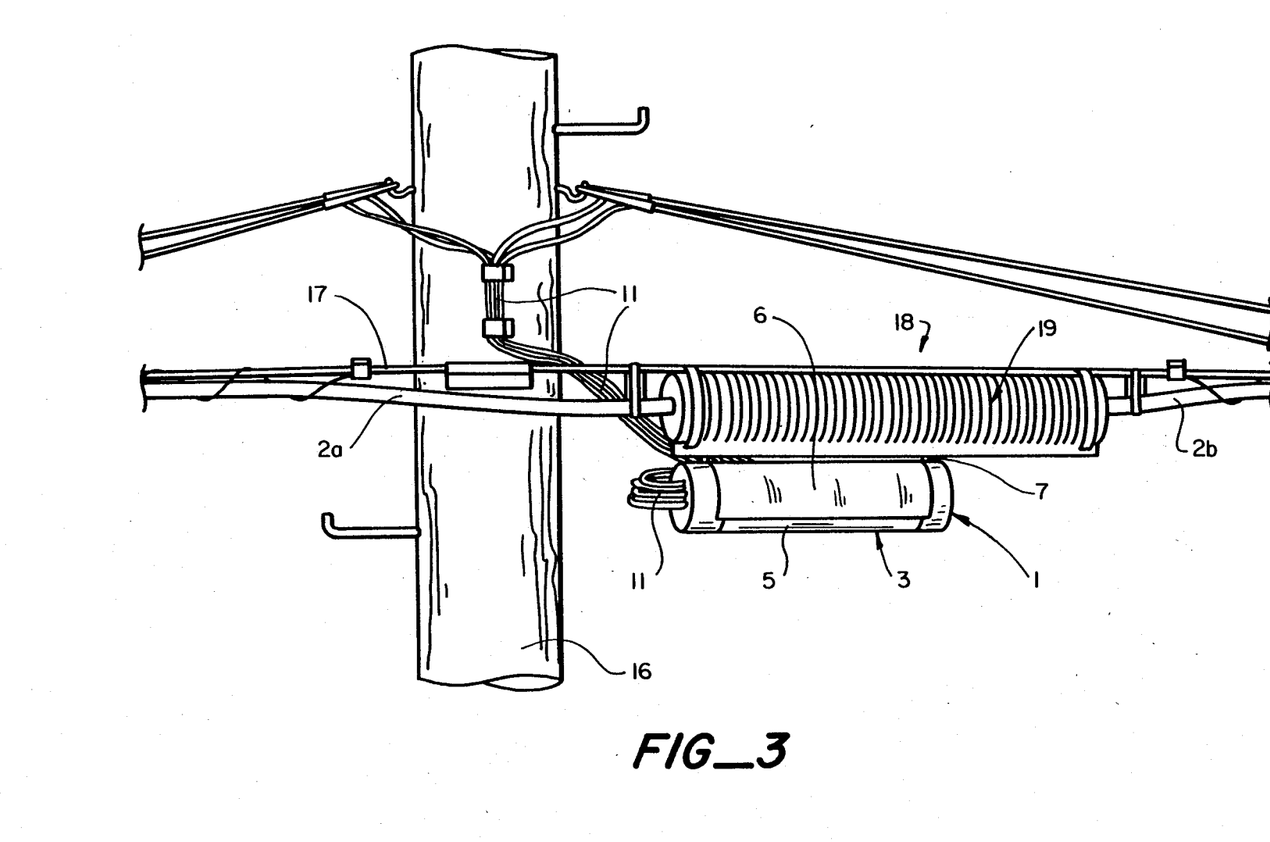

FIG. 3 shows an assembly 18 of the invention. Here two closures are provided. One, closure 19, provides environmental protection around a splice between cables 2a and 2b. Some of the conductors in either cable 2a or 2b (generally whichever is on the telephone company side) leave closure 19 and enter closure 1, preferably by means of a low pair count multiconductor cable. Those conductors are connected to a terminal block, or other connection means, within closure 1. As before, drop wires 11 are then connected to those conductors via the terminal block. The two closures, 1 and 19, are held together by suitable holding means such as straps. In the illustrated embodiment, the two closures are held together side-by-side.

Figure 4:
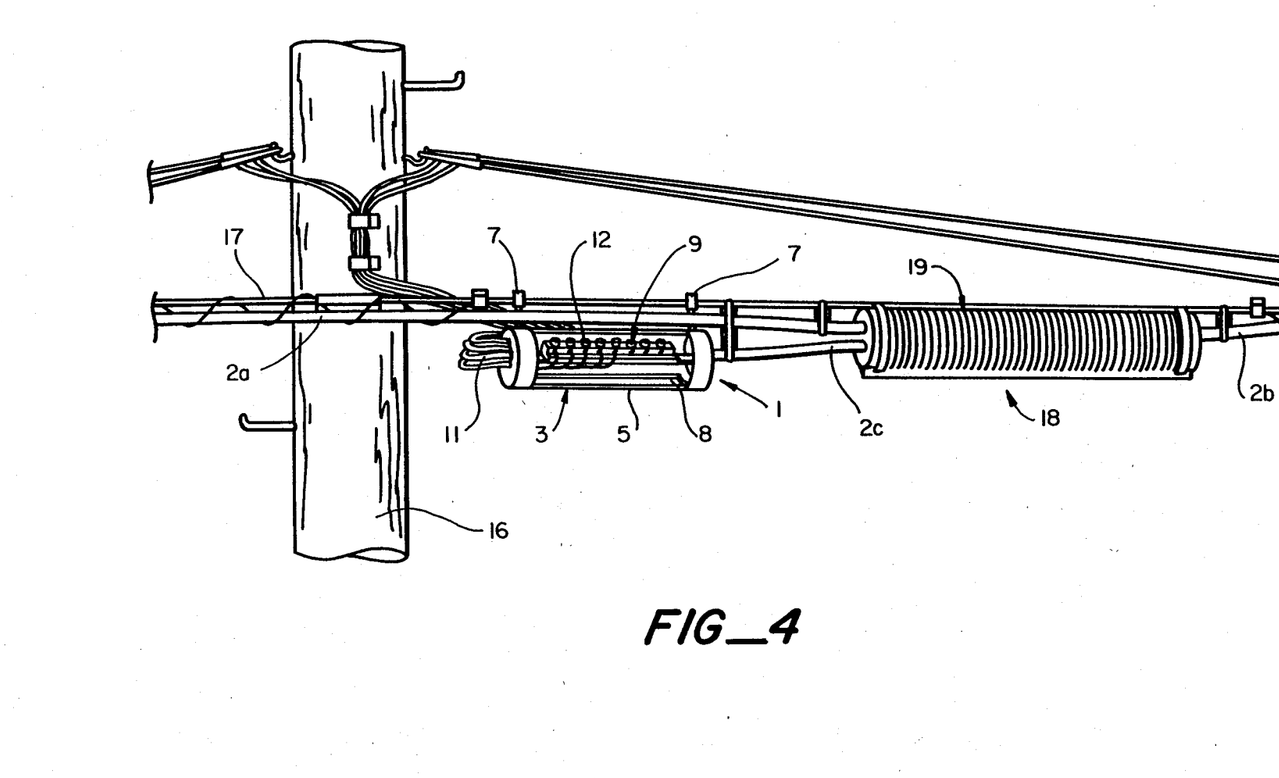

In FIG. 4, two closures, 1 and 19, are positioned end-to-end. Multi-core cable 2c can be seen connecting terminal block 9 of closure 1 to the splice within closure 19. The second part 6 is shown in an open position.

The closure 19 can be seen to have a corrugated outer surface. It preferably comprises half-shells that engage end pieces comprising sealing material such as a gel. The closure 1 may be corrugated or have end pieces in a similar way.

Figure 5:
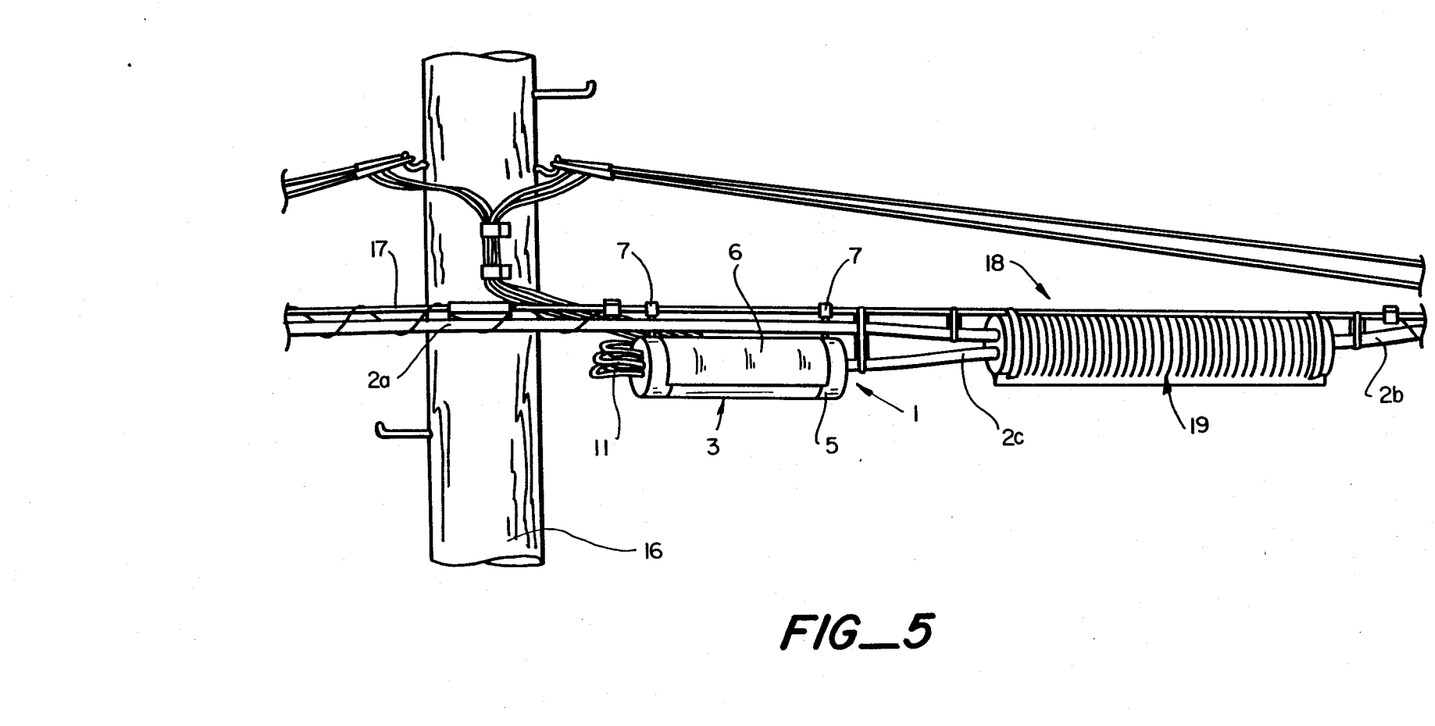

FIG. 5 is similar to FIG. 4, except the second part 6 is shown in a closed position.

Figure 6A:
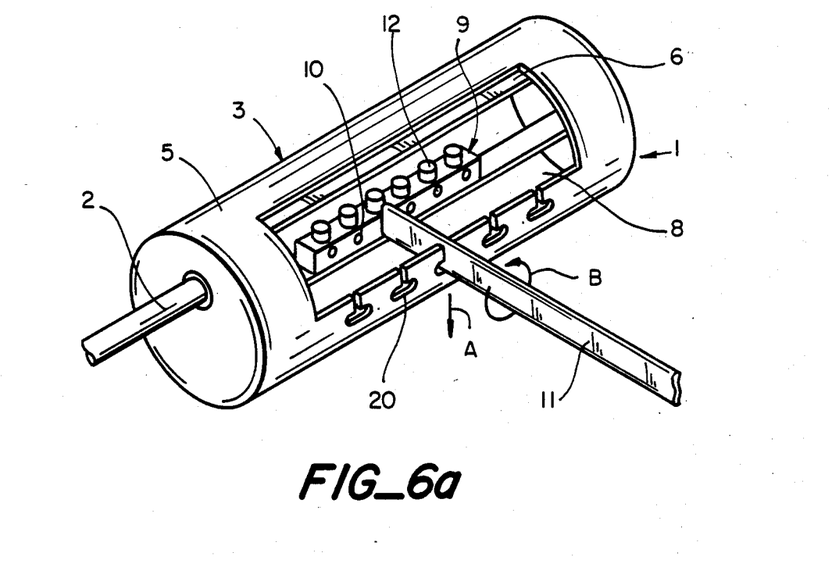
FIGS. 6a and 6b illustrate a closure having shaped outlets for drop wires.

FIG. 6 illustrates a closure 1, which is preferably but need not be a closure having the feature of a sliding second part. It has a connection means such as a terminal block 9 that may connected to a cable 2. The terminal block has holes 10 into which drop wires 11 are inserted. Electrical connection may be made by screwing down a cap 12. The invention illustrated in FIG. 6 has the advantage of allowing a drop wire 11 to be first connected to a terminal block and then to be positioned for proper exit from the closure. This may be achieved by means of slots 20 in an edge of the closure, such as an edge to the opening that is produced by movement of a second part (not illustrated in FIG. 6a) relative to a first part 5. Such slots allow lateral insertion of a drop wire. Particularly, where the drop wire is substantially rectangular or oval in cross-section the slot may have a first narrower portion and a second wider portion remote from the opening of the slot. The wire 11 is first placed laterally in the slot as indicated by arrow A, and then rotated as indicated by arrow B, thereby preventing its removal laterally. If the dimensions are so chosen, the wire may be a snap-fit into such a slot, its removal being easier by first rotating it.

Figure 6B:
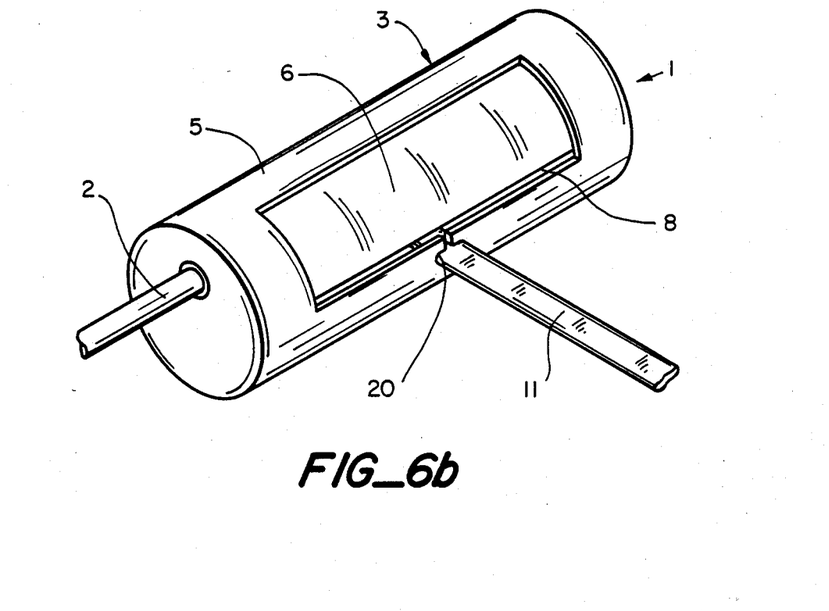

FIG. 6b illustrates how movement of the second part 6 to its closed position can lock the drop wires in the slots, and such locking may be provided in the absence of the special shaping of the slots described above.

Figure 7A:
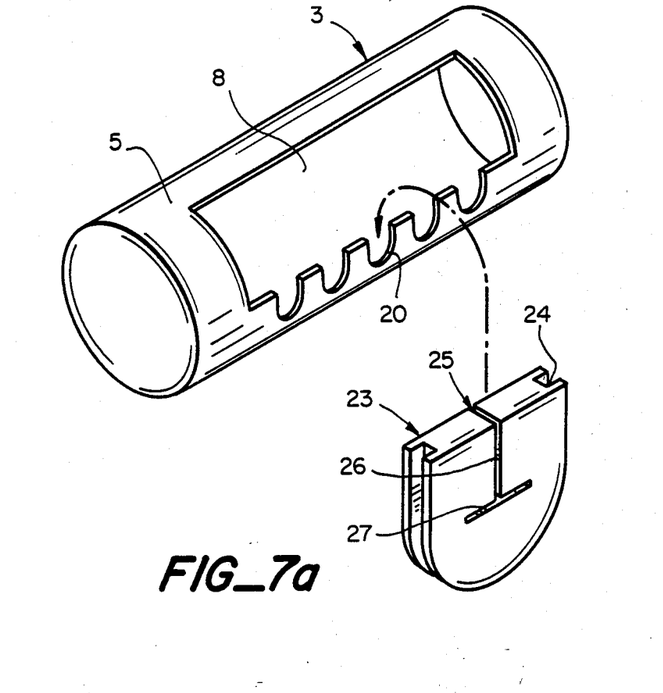
FIGS. 7a–7c illustrate grommets.
Figure 7B:
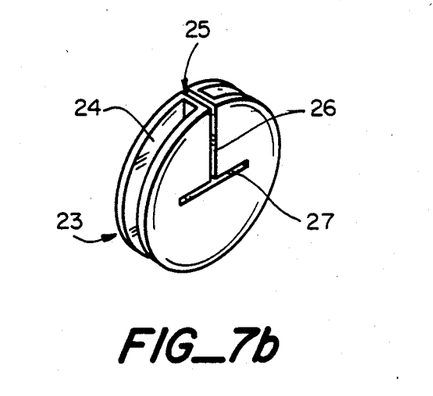

FIG. 7a shows a grommet 23 for use in a slot 20 in a closure body 3. Here the slot is of simple shape, but the grommet has either a narrower portion near the slot opening and a wider portion remote from the opening, or simply slots (which may be mere cuts 25) aligned in different directions, 26 and 27. The drop wire is pushed into the grommet and turned. The grommet may have recess 23 to aid its retention in the slot 20. A round grommet for use in an almost closed slot is shown in FIG. 7b.

Figure 7C:
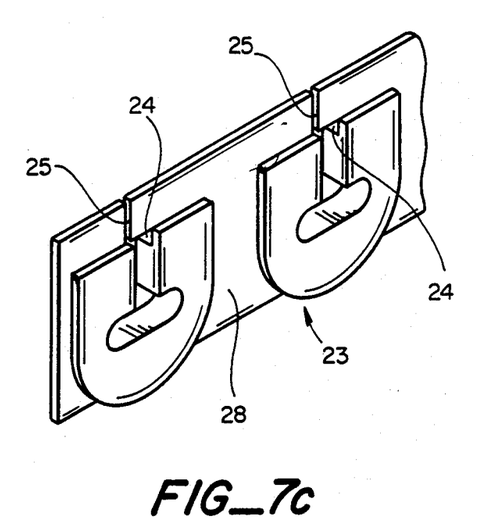

In FIG. 7c several grommets are integral with or bonded or otherwise fixed to a backing strip 28.

Figure 8:
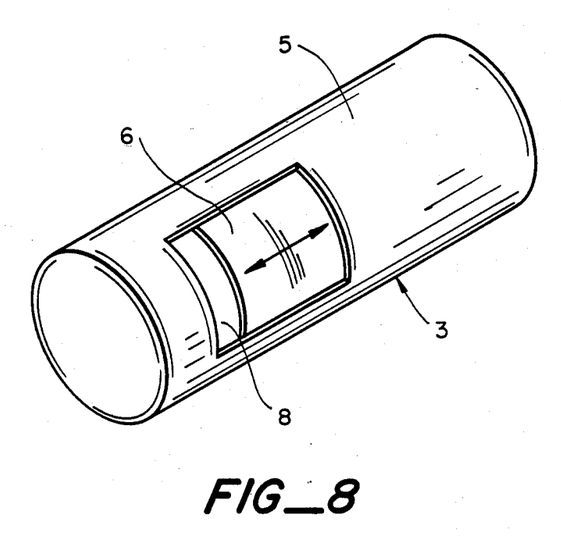
FIG. 8 illustrates an alternative closure body.

FIG. 8 shows an alternative design of closure body where sliding motion of the second part is linear rather than rotary.

Figure 9:
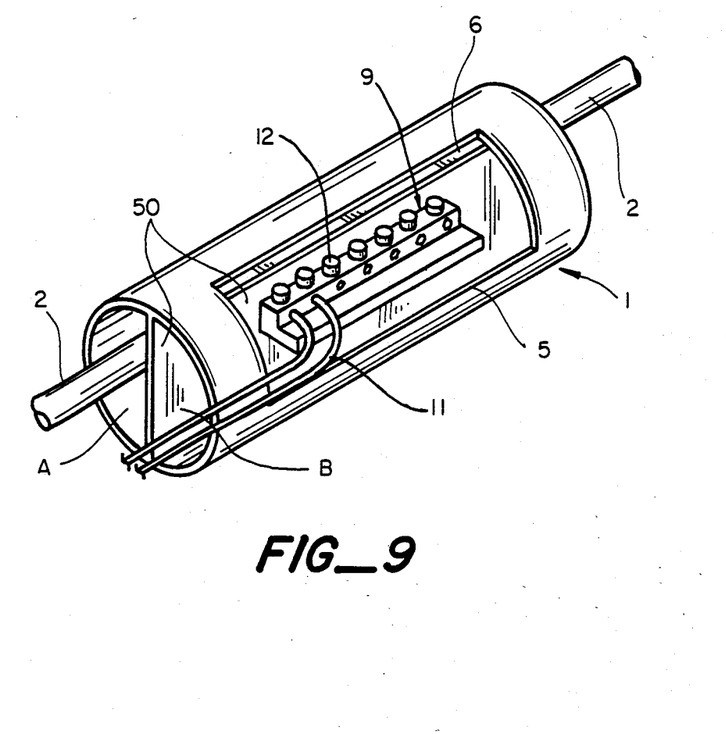
FIG. 9 illustrates a two compartment enclosure.

FIG. 9 illustrates a closure 5 with two compartments A and B. The divider 50 forms compartment A containing the cable 2 and compartment B containing the terminal block 9 having caps 12 to connect drop wires 11 thereto.

We claim:

1. A ready-axis cable closure capable of enclosing a connection to a cable and also providing for a seal for a wire or wires entering the closure apart from the connection to the cable, said closure comprising:
   (a) a closure body that can surround a connection; and
   (b) a seal capable of sealing between the body and the wire/wires leaving the body,
the closure body having a first part that may be fixed relative to the cable and a second part that is slideably fixed relative to the first part and can be slid from a first position where the first enclosure environmentally is capable of sealing the connection and the wire to a second position where it is supported by the first part and where it allows access to the connection and any wire entering the closure, at least a portion of the closure body is substantially cylindrical and the sliding motion of the second part is rotational about an axis of the cylinder portion of the closure body.

2. A closure according to claim 1, in which the seal (b) comprises a material having an ultimate elongation greater than 50%.

3. A closure according to claim 1, in which the seal (b) comprises a material having a cone penetration between 65 and 350 ($10^{-1}$ mm).

4. A closure according to claim 1, in which the seal (b) comprises a cured material, the material being cured prior to any contact with the cable and prior to any contact with the closure body.

5. A closure according to claim 1, in which the closure body is substantially cylindrical and the seal (b) fills a space between wires(s) entering the body, and an end portion of the body, wherein the wire(s) are selected from the group consisting of electrical wire, optical wire, or combinations thereof.

6. A closure according to claim 1, further comprising a terminal block within the body.

7. A closure according to claim 1, having an outlet for a cable and an outlet for a drop wire.

8. A closure according to claim 7, in which the outlet for a drop wire comprises a slot into which the drop wire can be slid laterally.

9. A closure according to claim 8, in which a grommet is provided in the slot.

10. A closure according to claim 8, in which the slot has a portion nearer its opening of narrower width and a portion farther from the opening of greater width, so that a drop wire or substantially rectangular or oval cross-section can be laterally inserted, and after rotation cannot be laterally removed.

11. A closure according to claim 9, in which the grommet has a slot having a portion nearer its opening of narrower width and a portion farther from the opening of greater width, so that a drop wire of substantially rectangular or oval cross-section can be laterally inserted and after rotation cannot be laterally removed.

12. A closure according to claim 9, in which the grommet has an opening therein shaped such that a drop wire can be laterally inserted and after rotation cannot be laterally removed.

13. A closure according to claim 1, in which the closure body is substantially cylindrical and has a plurality of outlets therein for drop wires, and the seal (b) fills a space between a cable entering the body and the body.

14. A closure according to claim 13, in which the outlets from drop wires are spaced longitudinally along the body.

15. A closure according to claim 1, having a slot-shaped outlet in said first part, an open end of said slot being closed by said second part when in said first position.

16. A cable closure an outlet for a conductor, said outlet being slot-shaped and having a portion nearer its opening of narrower width and a portion further from the opening of greater width so that a conductor, substantially rectangular or oval in cross-section, can be laterally inserted into the outlet in the closure and after rotation cannot be laterally removed.

17. A closure according to claim 16, in which said outlet is defined at least in part by a grommet.

18. A closure according claim 16, being substantially cylindrical and having a cable outlet at an end thereof and having a plurality of said slot-shaped outlets along its length.

19. A closure according to claim 16, having a terminal block therein.

20. A closure according to claim 17 wherein the outlet has an inverted "T" shape.

21. A cable closure body assembly for a cable and a terminal block which comprises:
 (a) a first compartment in the assembly for housing a cable splice; and
 (b) a second compartment in the assembly for housing a terminal block, the first and second compartments within a unitary closure body assembly, the unitary closure body assembly including a first part that may be fixed and a second part that may be slideable relative to the first part and can be slid from a first position which is capable of environmentally sealing the terminal block in the second compartment to a second position where it allows access to the terminal block without opening the first compartment.

22. A cable closure assembly according claim 21 further comprising means for sealing the to a able, said means for sealing comprises a material having an ultimate elongation greater than about 50% and a cone penetration between about 65 and about 350 ($10^{-1}$ mm).

23. A cable closure assembly according to claim 22 further comprising an outlet, for a drop wire capable of being connected to the terminal block, which a slot into which the drop wire can be slid slot having a portion nearer its opening of and a portion farther from the opening of width, so that a drop wire of substantially rectangilar or oval cross-section can be laterally inserted, and after rotation cannot be laterally removed.

24. A cable closure assembly according claim 23 wherein a grommet is provided in the slot to form a seal around the drop wire.

* * * * *